United States Patent
Barron et al.

(10) Patent No.: US 7,178,732 B1
(45) Date of Patent: Feb. 20, 2007

(54) BAR CODE READER WITH IMAGE DISPLAY SYSTEM

(75) Inventors: Peter B. Barron, Tucker, GA (US); David L. Gregerson, Lawrenceville, GA (US); John E. Wilson, Duluth, GA (US)

(73) Assignee: NCR Corporation, Dayton, OH (US)

( * ) Notice: Subject to any disclaimer, the term of this patent is extended or adjusted under 35 U.S.C. 154(b) by 32 days.

(21) Appl. No.: 10/983,853

(22) Filed: Nov. 8, 2004

(51) Int. Cl.
*G06K 7/10* (2006.01)

(52) U.S. Cl. .............................. 235/462.14; 235/462.01

(58) Field of Classification Search ........... 235/462.14, 235/462.15, 462.17, 462.01; 358/474, 509, 358/505–506
See application file for complete search history.

(56) References Cited

U.S. PATENT DOCUMENTS

| | | | |
|---|---|---|---|
| 4,575,623 A * | 3/1986 | Cononi et al. .............. 235/383 |
| 6,213,394 B1 * | 4/2001 | Schumacher et al. ....... 235/383 |
| 6,598,791 B2 * | 7/2003 | Bellis et al. ................. 235/383 |
| 6,854,655 B2 * | 2/2005 | Barkan ..................... 235/462.4 |
| 6,974,083 B1 * | 12/2005 | Kahn et al. ............ 235/462.14 |
| 2002/0010496 A1 * | 1/2002 | Greenberg et al. ............ 607/54 |
| 2002/0071076 A1 * | 6/2002 | Webb et al. ................. 349/117 |
| 2003/0010825 A1 * | 1/2003 | Schmidt et al. ........ 235/462.14 |
| 2003/0201326 A1 * | 10/2003 | Bobba et al. .......... 235/462.14 |
| 2003/0205620 A1 * | 11/2003 | Byun et al. ............ 235/462.14 |
| 2004/0000591 A1 * | 1/2004 | Collins et al. ......... 235/462.14 |

\* cited by examiner

*Primary Examiner*—Thien M. Le
*Assistant Examiner*—Edwyn Labaze
(74) *Attorney, Agent, or Firm*—Priest & Goldstein, PLLC

(57) ABSTRACT

A bar code reader which includes an image display system to more effectively promote retailers and their products. The bar code reader includes a housing portion and an image display system in the housing portion. An example bar code reader includes a dual-aperture bar code reader with a first housing portion containing a substantially horizontal aperture through which first scanning light beams pass for scanning an item, and a second housing portion vertically extending from a checkout counter containing a substantially vertical aperture through which second scanning light beams pass for scanning the item. The second housing portion includes a surface visible to the customer and an image display system in the surface.

17 Claims, 5 Drawing Sheets

BAR CODE READER WITH IMAGE DISPLAY SYSTEM

BACKGROUND OF THE INVENTION

The present invention relates to bar code readers and more specifically to a bar code reader with an image display system.

Bar code readers are well known for their usefulness in retail checkout and inventory control. Some bar code readers have single apertures and other bar code readers have multiple apertures for scanning bar code labels from multiple directions.

Advertising and brand promotion are important to retailers. Therefore, it would be desirable to provide a bar code reader with an image display system.

SUMMARY OF THE INVENTION

In accordance with the teachings of the present invention, a bar code reader with an image display system is provided.

The bar code reader includes a housing portion and an image display system in the housing portion. An example bar code reader includes a dual-aperture bar code reader with a first housing portion containing a substantially horizontal aperture through which first scanning light beams pass for scanning an item, and a second housing portion vertically extending from a checkout counter containing a substantially vertical aperture through which second scanning light beams pass for scanning the item. The second housing portion includes a surface visible to the customer and an image display system in the surface.

It is accordingly an object of the present invention to provide a bar code reader with an image display system.

It is another object of the present invention provide a bar code reader with changeable, illuminated, customer specific marketing and branding images.

It is another object of the present invention provide additional visual feedback for cashiers and hearing impaired customers.

BRIEF DESCRIPTION OF THE DRAWINGS

Additional benefits and advantages of the present invention will become apparent to those skilled in the art to which this invention relates from the subsequent description of embodiments and the appended claims, taken in conjunction with the accompanying drawings, in which:

DETAILED DESCRIPTION

Figure 1:
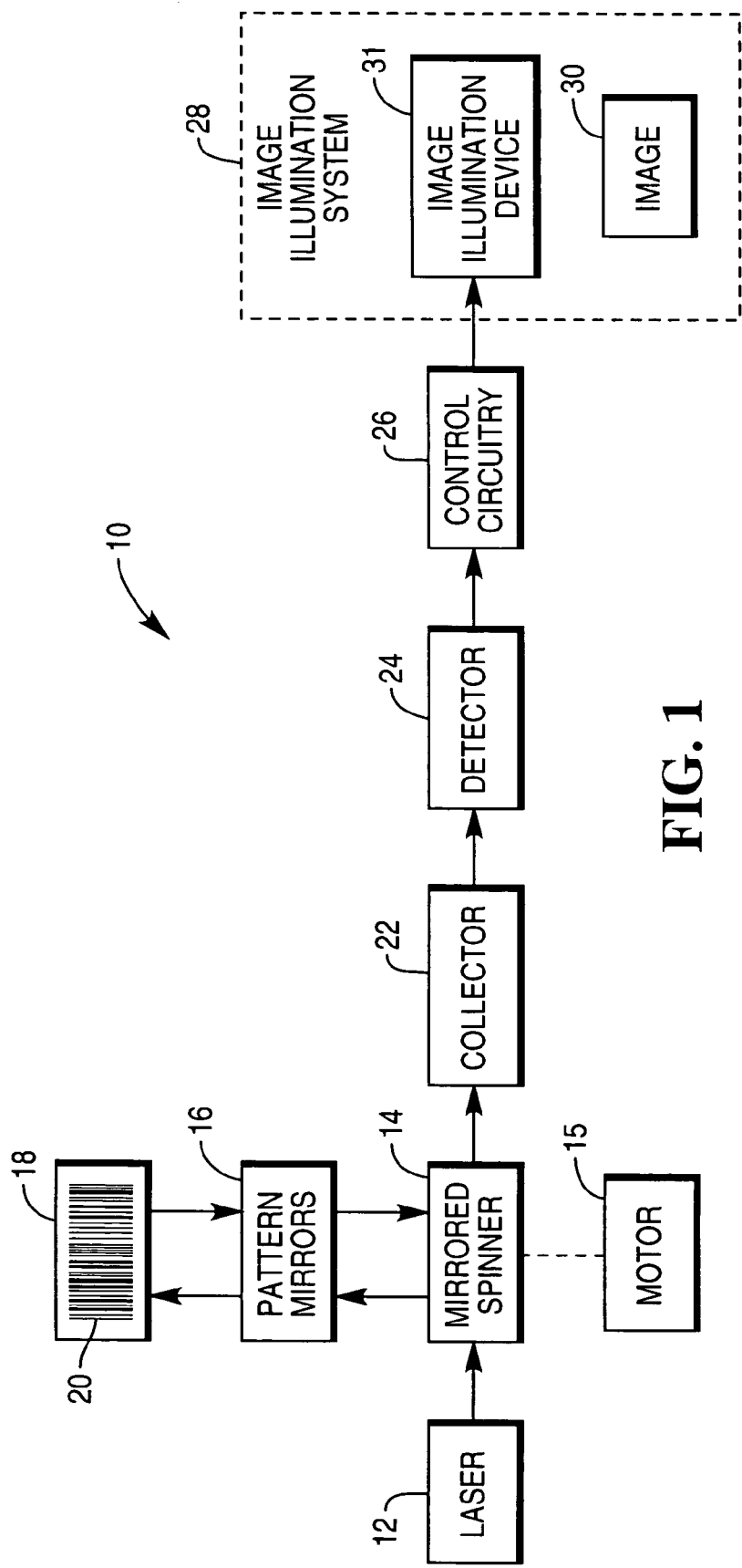
FIG. 1 is a block diagram of a bar code reader with a first example image illumination system.

Referring now to FIG. 1, bar code reader 10 may include an optical bar code reader. Bar code reader 10 may include other types of readers besides optical readers, such as image capturing bar code readers with charge coupled device cameras.

With reference to FIG. 1, bar code reader includes laser 12, mirrored spinner 14, pattern mirrors 18, collector 22, detector 24, control circuitry 26, and image display system 28.

Laser 12 includes a laser diode, a focusing lens or lenses, and a collimating aperture for producing a laser beam.

Mirrored spinner 14 has a plurality of planoreflective mirrored facets for sweeping the laser beam across pattern mirrors 16 to produce scanning beams. Mirrored spinner 14 also directs light reflected from item 18 towards collector 22. Mirrored spinner is rotated by motor 15.

Pattern mirrors 18 produce a plurality of scan lines for scanning bar code 20 on item 18. Pattern mirrors receive the light reflected from item 18 and direct it back towards mirrored spinner 14.

Collector 22 collects the light reflected from item 18 and directs it towards detector 24.

Detector 24 generates electrical signals representing the intensity of the reflected light.

Control circuitry 26 controls operation of laser 12 and motor 15, and decodes bar code information from the electrical signals produced by detector 24.

Figure 2:
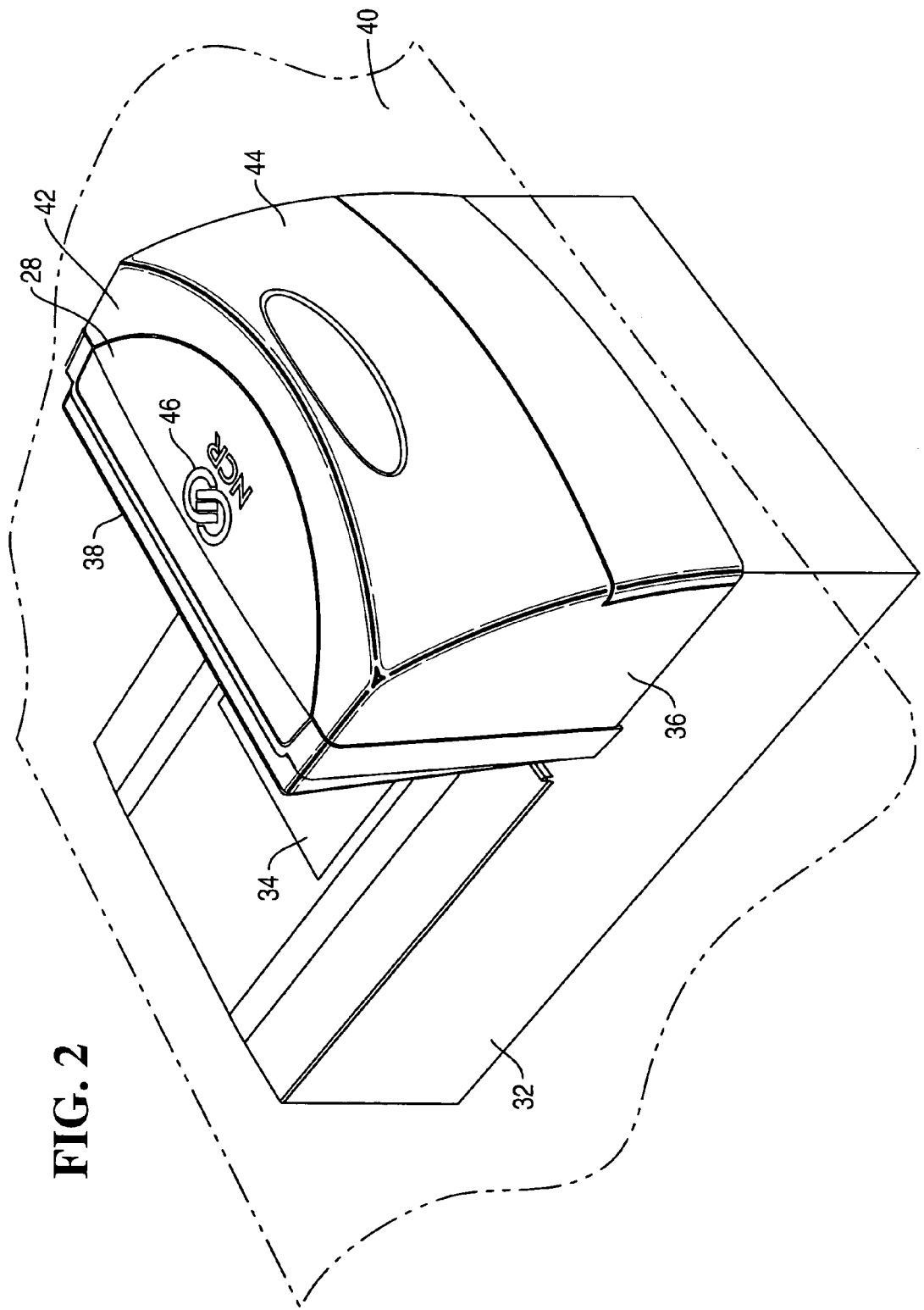
FIG. 2 is a perspective view of an example bar code reader including the first example image illumination system.
Figure 3:
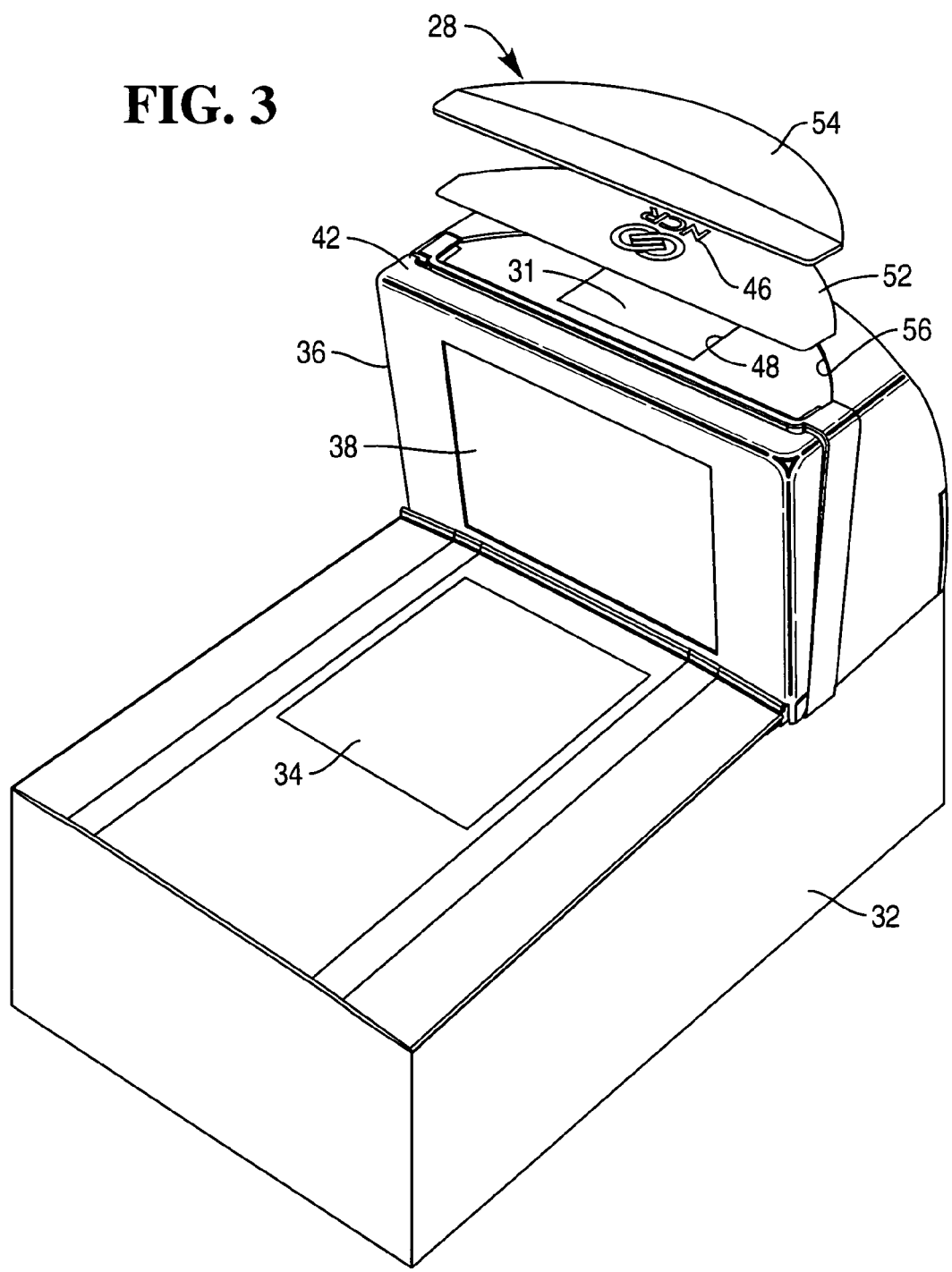
FIG. 3 is a view of the example bar code reader of FIG. 2 with an exploded view of the first example image illumination system.

In accordance with the present invention, bar code reader 10 includes an integrated image display system 28. With reference to FIGS. 1–3, image display system may include a printed or embossed image 30.

Image display system 28 may further include an illumination device 31 for illuminating the printed or embossed image 30. Control circuitry 26 may control image illumination device 31. However, it is also envisioned that image illumination device 31 operates independently of control circuitry 26. Image illumination device 31 may include a backlight.

In yet another embodiment (FIGS. 4–5), image display system 28 may instead include a computer display for displaying images provided by a computer.

The images of image display system 28 may include a store brand, a marketing slogan, advertisement, or any other image for the purpose of conveying information or suggestions to a customer at a checkout counter and adjacent bar code reader 10.

In accordance with the example embodiment of FIG. 1, control circuitry 26 may activate image illumination device 31 following each successful reading of a bar code label. Image 30 may be visible or not visible when image illumination device is deactivated.

Alternatively, image illumination device 31 may be in a dim state and flash brighter following each successful read. The flashing may be single and or multiple flashes, or flashing with a designed pattern. Either way, these operating methods have the added advantage of providing additional visual feedback to cashiers and hearing impaired customers.

Image illumination device 31 may also be tied into servicing of bar code reader 10 to provide diagnostic feedback to operators and service technicians.

With reference to FIGS. 2 and 3, an example bar code reader 10 including a first example image display system 28 is shown.

Example bar code reader 10 includes a multi-aperture bar code reader having a first portion 32 containing a substantially horizontal aperture 34 and second portion 36 containing a substantially vertical aperture 38. First portion 32 is mounted within checkout counter 40, while second portion 36 extends above checkout counter 40.

Bar code reader 10 may alternatively include a single-aperture bar code reader, such as a vertically mounted presentation scanner.

Image display system 28 may be located within any surface of second portion 36. In the illustrated example, image display system 28 is located in aperture 48 of top surface 42. Another suitable location is in customer side surface 44. Image display system 28 is displaying a customer logo 46.

With reference to FIG. 3, the first example illumination system 28 further includes image illumination device 31, strip 52, and cover 54.

Image illumination device 31 is located in the approximate center of top surface 42. Alternatively, image illumination device 31 may include edge lighting with etching glow.

Strip 52 rests on image illumination device 31. Strip 52 may be made of plastic, such as a Lexan® plastic from General Electric, and may be semi-transparent. Strip 52 includes a printed or embossed image 30 of customer logo 46. Customer logo 46 may be visible or not visible without illumination.

Cover 54 may also be made of plastic and may be transparent. Cover 54 snaps into a detent 56 in top surface 42 around perimeter 58 so as to retain strip 52. Cover 54 may be easily removed from detent 56 in order to replace strip 52 with a different strip 52 containing a different image, such as a seasonal promotion.

Figure 4:
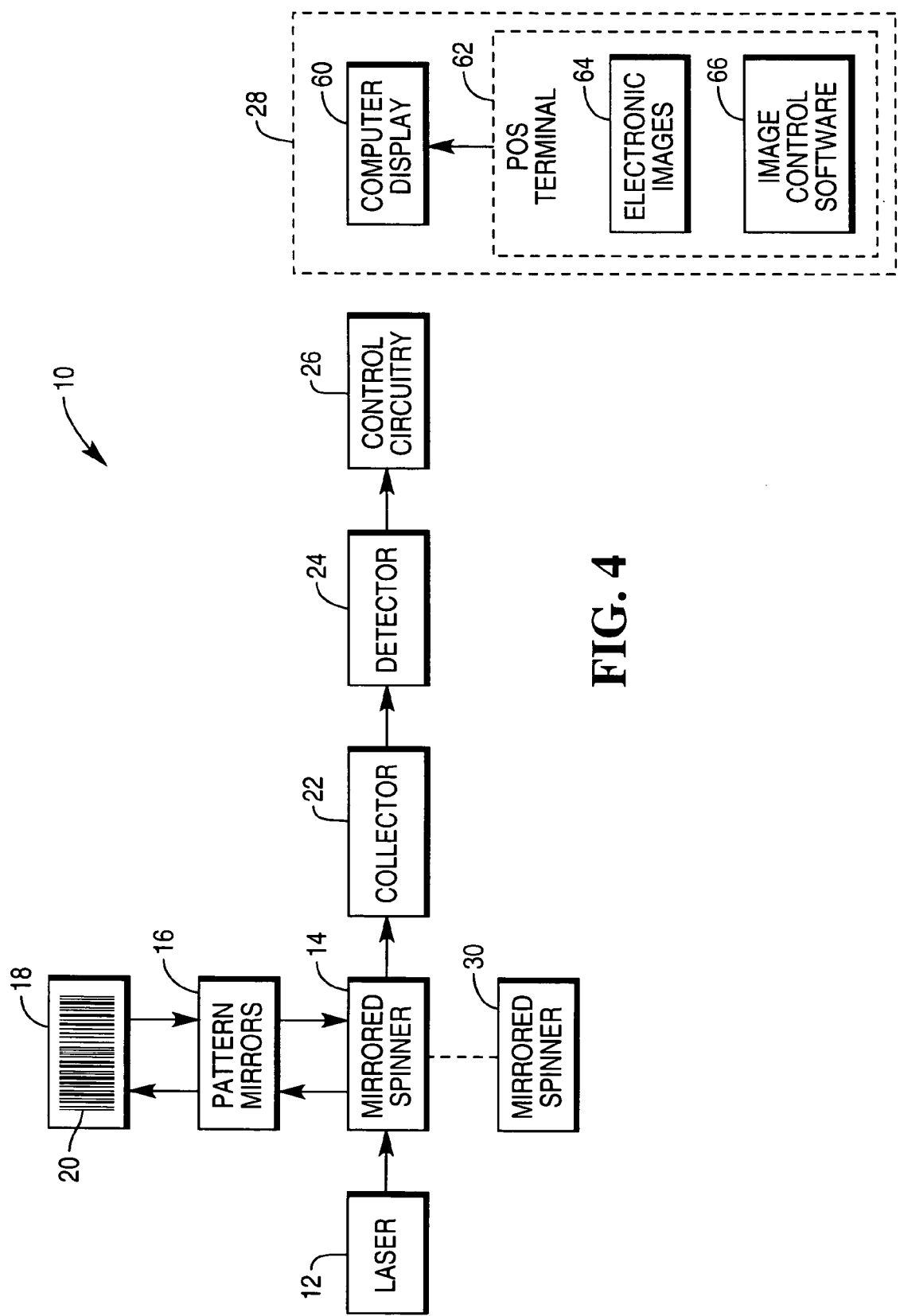
FIG. 4 is a block diagram of a bar code reader with a second example image illumination system.
Figure 5:
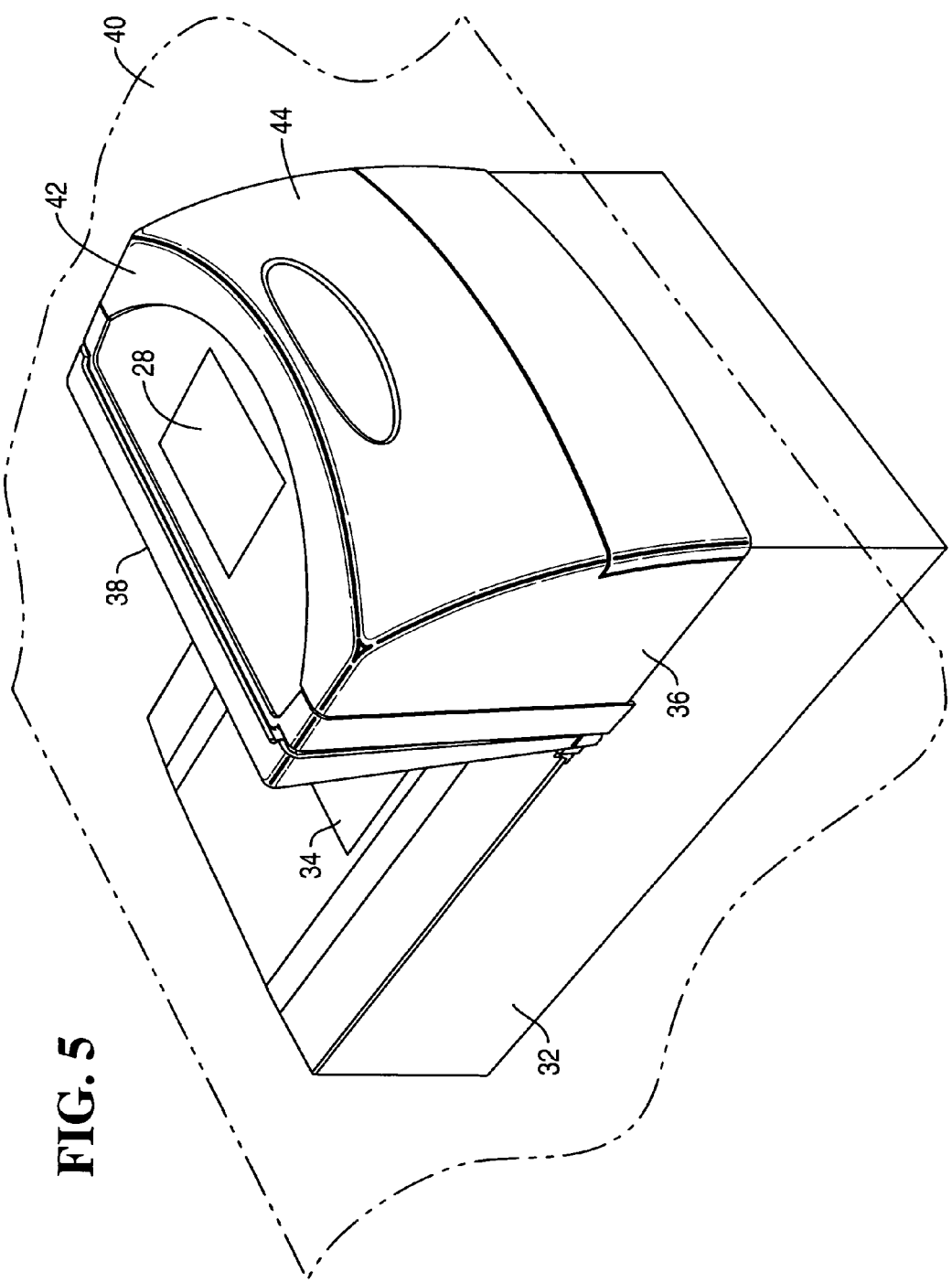
FIG. 5 is a perspective view of the example bar code reader including the second example image illumination system.

With reference to FIGS. 4 and 5, bar code reader 10 includes a second example image display system 28. In this example, image display system 28 includes a computer display 60. Computer display 60 may include a liquid crystal display (LCD). Computer display 60 is mounted in top surface 42 of bar code reader 10, but may be mounted elsewhere in portion 36.

Computer display 60 may be controlled by point-of-sale terminal 62 through a separate cable to bar code reader 10. Point-of-sale terminal 62 may store electronic images 64 for display by computer display 60. For this purpose, point-of-sale terminal 62 may execute image control software 66 which causes an operator selected electronic image 64 or a sequence of electronic images 64 to be displayed by computer display 60 so long as point-of-sale terminal 62 is in operation.

Advantageously, bar code reader 10 with image display system 28 allows store operators to more effectively promote themselves and their products.

Although the invention has been described with particular reference to certain embodiments thereof, variations and modifications of the present invention can be effected within the spirit and scope of the following claims.

What is claimed is:

1. A bar code reader comprising:
a first housing portion which may be suitably mounted in a checkout counter;
a second housing portion extending above the checkout counter when the first portion is mounted in the checkout counter and having a top surface readily visible to both a customer when the customer stands adjacent to the checkout counter and a cashier when scanning items to be purchased by the customer; and
a changeable image display system in the top surface of the second housing portion.

2. The bar code reader of claim 1, wherein the changeable image display system comprises:
a plastic sheet bearing an image; and
an illumination device for illuminating the image.

3. The bar code reader of claim 2, wherein the light illumination device comprises a backlight behind the plastic sheet.

4. The bar code reader of claim 2, wherein the bar code reader further comprises control circuitry for changing the illumination of the image following each successful reading of a bar code to provide additional visual feedback to cashiers and hearing impaired customers.

5. The bar code reader of claim 2, wherein the illumination device comprises edge lighting around the plastic sheet.

6. The bar code reader of claim 2 wherein the plastic sheet rests on top of the illumination device and is held in place by a transparent plastic cover which may be easily removed to replace the plastic sheet with a different one.

7. The bar code reader of claim 1, wherein the image display system comprises:
a computer display for displaying an image stored within a computer.

8. The bar code reader of claim 7, wherein the computer display comprises a liquid crystal display.

9. The bar code reader of claim 8, wherein the computer display displays customer specific marketing and branding images.

10. The bar code reader of claim 1, wherein the image display system displays promotional images.

11. The bar code reader of claim 1, wherein the image display system displays a company logo.

12. The barcode reader of claim 1 wherein the first housing portion further comprises a substantially horizontal aperture through which first scanning light beams pass for scanning an item; and
the second housing portion extends vertically from the first housing portion and further comprises a substantially vertical aperture through which second scanning light beams pass for scanning the item.

13. The bar code reader of claim 1 wherein the image display system provides diagnostic feedback to operators and service technicians during servicing of the bar code reader.

14. A bar code reader suitable for use at a customer checkout counter comprising:
a housing extending above the customer checkout counter;
a changeable image display system in a customer visible surface of the housing when the bar code reader is utilized at the customer checkout counter; and
control circuitry for changing the illumination of the changeable image display system following each successful reading of a bar code to provide additional visual feedback of a successful read.

15. The bar code reader of claim 14, wherein the image display system comprises:
a computer display for displaying an image stored within a computer.

16. The bar code reader of claim 15, wherein the computer display comprises a liquid crystal display.

17. The bar code reader of claim 16, wherein the computer display displays customer specific marketing and branding images.

* * * * *